W. LOVATT.
PISTON PACKING RING.
APPLICATION FILED JULY 15, 1914.

1,144,486.

Patented June 29, 1915.

Witnesses

Inventor
William Lovatt
By
Attorneys

UNITED STATES PATENT OFFICE.

WILLIAM LOVATT, OF GREENPORT, NEW YORK.

PISTON PACKING-RING.

1,144,486.

Specification of Letters Patent.

Patented June 29, 1915.

Application filed July 15, 1914. Serial No. 851,195.

*To all whom it may concern:*

Be it known that I, WILLIAM LOVATT, a citizen of the United States, residing at Greenport, in the county of Suffolk, State of New York, have invented certain new and useful Improvements in Piston Packing-Rings; and I do hereby declare the following to be a full, clear, and exact description of the invention, such as will enable others skilled in the art to which it appertains to make and use the same.

This invention relates to packing rings, particularly to packing rings for engine pistons, and has for its object the provision of a novel packing ring for the pistons of gas, steam or other engines which is so constructed of outwardly spring pressed interlocked sections that it will expand uniformly into contact with the interior periphery of an engine cylinder for forming a tight fit whereby the maximum degree of efficiency of the engine is obtained.

An important object is the provision of a packing ring so formed and interlocked that it is quickly and easily removable.

Another important object is the provision of a packing ring of this character which is so constructed as to compensate for lack of trueness of a piston within the cylinder such as is caused by an improperly alined crank shaft.

A further object is the provision of a device of this character constructed so simply as to be quickly and easily placed in position or removed by one not specially skilled as a mechanic.

Other objects and advantages such as cheapness, efficiency and durability and the general improvement of the art will be fully brought out in the following description and illustrated in the accompanying drawing, in which—

Figure 1:
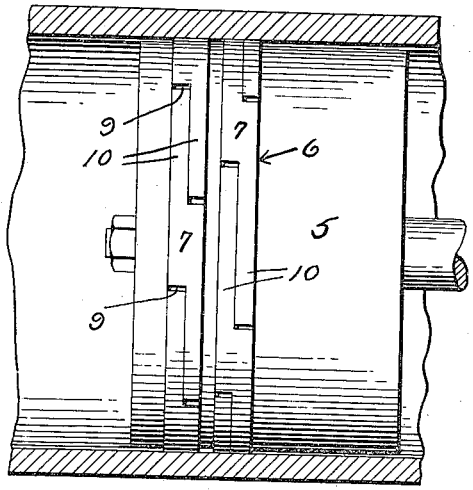
Figure 4:
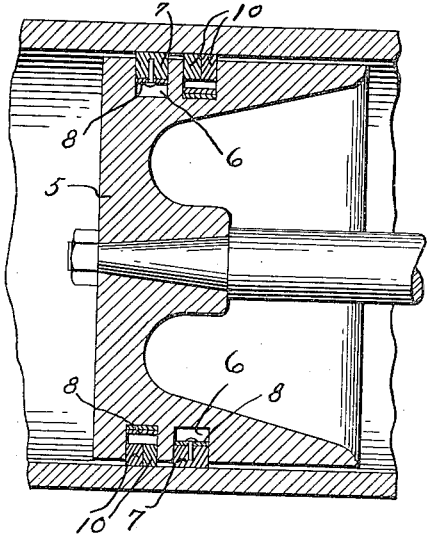
Figure 3:
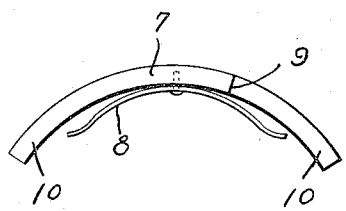
Figure 2:
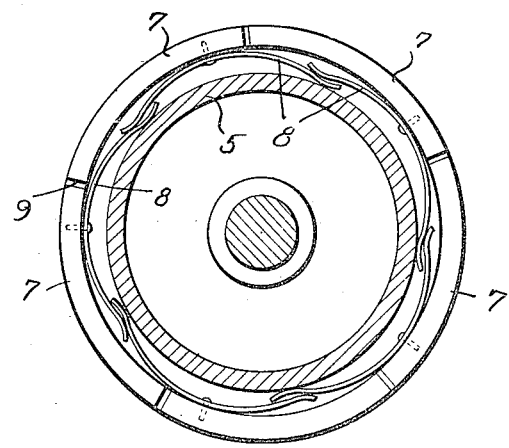

Figure 1 is a side elevation of an engine piston carrying my novel packing rings. Fig. 2 is a cross sectional view therethrough, Fig. 3 is a side elevation of one of the ring sections detached, and Fig. 4 is a vertical sectional view.

Referring more particularly to the drawing, the numeral 5 designates an engine piston of any ordinary or preferred type provided with the usual grooves 6 for the reception of packing rings.

My novel packing ring is adapted to seat within a groove 6 and comprises a plurality of arcuate sections 7 to the central portion of each one of which is secured a leaf spring 8 which bears against the inner face of the groove 6. In order that the sections 7 may interfit, I provide each section with cutout portions 9 upon its upper and lower faces respectively forming arms 10 of reduced thickness and in staggered relation to each other. When the sections 7 are assembled within the grooves 6, the arms 10 of one section fit within the cutout portions 9 of each adjacent section, as shown in Fig. 1 and the spring on one section overlaps the springs on the adjacent sections.

From the foregoing description and a study of the drawing it will be apparent that as the sections of the ring are urged outwardly by the springs there will be produced and insured a perfect fit of the piston within the engine cylinder whereby leakage around the piston will be prevented thus securing the maximum compression within the cylinder for developing the greatest amount of power. It will also be observed that by this construction it is unnecessary to have the inner faces of the sections turned as they may be finished rough owing to the fact that the sections themselves do not contact with the inner face of the groove in the piston. Another important feature is that as the outer faces of the sections wear away, the springs will force the sections outwardly and thus insure a perfect fit within the cylinder regardless of the amount of wear on the sections. It is also to be noted that in a gas engine having its pistons equipped with my novel packing rings, in case the crank shaft is not in exact alinement with the bore of the cylinders, the usual pounding ordinarily resulting from such a condition will be eliminated by my packing ring as the sections will move inwardly against resistance of the springs and thus allow the piston to accommodate itself properly to the cylinder. It is therefore to be observed that I have thus provided a piston packing ring which will effectively perform all the function that could be required of it.

Although I have shown and described my device as applied particularly to gas engines, it will be readily understood that my piston rings are adapted for use on any and all devices in which it is necessary to have a piston slidable within a cylinder. In water pumps my rings may be used with great efficiency by forming them of brass and substituting them for hemp packing commonly in use. In use my piston rings are productive of economy as they not only take up wear automatically but have packing in the stuffing boxes of the device upon which they are used.

Having thus described my invention, I claim:

1. In combination with the grooved piston of an engine, a packing ring comprising a plurality of interfitting arcuate sections seated within said groove, and a spring on each section bearing against the inner face of the groove and upon which the ends of the adjacent sections rest, the ends of the springs overlapping.

2. In combination with the grooved piston of an engine, a packing ring comprising a plurality of arcuate sections disposed in said groove, each section being transversely cut away to provide oppositely extending laterally reduced arms in staggered relation to each other, the reduced arms of each section overlapping and interfitting with the reduced arms of the adjacent sections, and a leaf spring secured to each section and engaging the inner face of the groove, the extremities of each arcuate section resting upon the springs that are secured to the sections at both ends thereof.

3. In combination with the grooved piston of an engine, a packing ring comprising a plurality of interfitting sections seated within said grooves, and a spring on each section bearing against the inner face of the groove and upon which the ends of the adjacent sections rest.

In testimony whereof I affix my signature, in the presence of two witnesses.

WILLIAM LOVATT.

Witnesses:
JOHN L. CHAPMAN,
WM. REICHART.